(12) United States Patent
Hayward et al.

(10) Patent No.: US 11,961,102 B2
(45) Date of Patent: *Apr. 16, 2024

(54) UPSELLING TO CUSTOMERS FOLLOWING INITIAL ONLINE PURCHASE

(71) Applicant: CLICK SALES INC., Boise, ID (US)

(72) Inventors: John Hayward, Broomfield, CO (US); Jonathan Sabados, Federal Heights, CO (US)

(73) Assignee: CLICK SALES INC., Boise, ID (US)

( * ) Notice: Subject to any disclaimer, the term of this patent is extended or adjusted under 35 U.S.C. 154(b) by 406 days.

This patent is subject to a terminal disclaimer.

(21) Appl. No.: 17/345,989

(22) Filed: Jun. 11, 2021

(65) Prior Publication Data
US 2021/0304239 A1 Sep. 30, 2021

Related U.S. Application Data

(63) Continuation of application No. 12/751,832, filed on Mar. 31, 2010, now Pat. No. 11,062,339.

(51) Int. Cl.
*G06Q 30/0207* (2023.01)
*G06Q 30/0251* (2023.01)

(52) U.S. Cl.
CPC ..... *G06Q 30/0207* (2013.01); *G06Q 30/0253* (2013.01)

(58) Field of Classification Search
CPC .................................. G06Q 30/0207–30/0277
USPC ..................................................... 705/1, 319
See application file for complete search history.

(56) References Cited

U.S. PATENT DOCUMENTS

| | | | | |
|---|---|---|---|---|
| 7,418,405 B1* | 8/2008 | Utter | ................. | G06Q 30/0635 705/26.81 |
| 8,712,857 B1* | 4/2014 | Adornato | ........... | G06Q 30/0207 705/26.7 |
| 9,972,023 B1* | 5/2018 | Hust | .................. | G06Q 30/0201 |
| 11,710,179 B1* | 7/2023 | Kaditz | ............... | G06Q 30/0641 705/38 |
| 2002/0077960 A1* | 6/2002 | Kiely | ..................... | G06Q 40/04 705/37 |
| 2002/0156699 A1* | 10/2002 | Gray | .................. | G06Q 30/0601 705/26.1 |
| 2005/0098625 A1* | 5/2005 | Walker | ............... | G06Q 30/0241 705/15 |

(Continued)

OTHER PUBLICATIONS

Customer_relationship_management_in_an_e-business_environment (Year: 2001).*

(Continued)

*Primary Examiner* — Gautam Ubale
(74) *Attorney, Agent, or Firm* — Fenwick & West LLP

(57) ABSTRACT

An upsell purchase flow in an e-commerce system is provided. After a customer has purchased a product from a vendor, an upsell opportunity is provided to the customer through an upsell pitch page. The upsell pitch page advertises an additional upsell product in order to maximize the purchase transaction with the customer. Responsive to the customer accepting the upsell opportunity, rather than adding the upsell product to an electronic shopping cart, a marketplace server that facilitates transactions between the customer and the vendor charges the customer for the upsell product at that time. Multiple upsell opportunities may be provided to the customer after the initial sale is completed.

19 Claims, 7 Drawing Sheets

(56) References Cited

U.S. PATENT DOCUMENTS

| | | | |
|---|---|---|---|
| 2006/0167811 A1* | 7/2006 | Bhambri | G06Q 30/02 705/59 |
| 2008/0091530 A1* | 4/2008 | Egnatios | G06Q 30/0224 705/14.25 |
| 2008/0183591 A1 | 7/2008 | Olsson et al. | |
| 2008/0249870 A1* | 10/2008 | Angell | G06Q 30/0269 705/14.66 |
| 2008/0255994 A1* | 10/2008 | Schnell | G06Q 30/02 705/52 |
| 2008/0256592 A1* | 10/2008 | Schnell | G06F 21/1012 726/1 |
| 2009/0138342 A1 | 5/2009 | Otto et al. | |
| 2009/0182677 A1 | 7/2009 | Otto et al. | |
| 2012/0215631 A1* | 8/2012 | Walker | G06Q 20/387 705/14.51 |

OTHER PUBLICATIONS

The_net_effect_environmental_implications_of_e-commerce_and_logistics (Year: 2001).*

Using_decision_tree_and_association_rules_to_predict_cross_selling_opportunities (Year: 2008).*

A_recommender_for_targeted_advertisement_of_unsought_products_in_e-commerce (Year: 2005).*

Basak, J. et al., "Cross-Channel Customer Mapping," Seventh IEEE/ACIS International Conference on Computer and Information Science, May 2008, pp. 119-126.

ip.com, "System for processing product sales at an automated point-of-sale terminal utilizing the determination and distribution of upsell items," Nov. 21, 2000, pp. 1-3.

United States Office Action, U.S. Appl. No. 12/751,832, dated Sep. 14, 2020, 15 pages.

United States Office Action, U.S. Appl. No. 12/751,832, dated Apr. 4, 2018, 21 pages.

United States Office Action, U.S. Appl. No. 12/751,832, dated May 4, 2017, 21 pages.

United States Office Action, U.S. Appl. No. 12/751,832, dated Jun. 29, 2016, 22 pages.

United States Office Action, U.S. Appl. No. 12/751,832, dated Jul. 28, 2015, 18 pages.

United States Office Action, U.S. Appl. No. 12/751,832, dated Nov. 28, 2014, 16 pages.

United States Office Action, U.S. Appl. No. 12/751,832, dated Mar. 7, 2013, 14 pages.

United States Office Action, U.S. Appl. No. 12/751,832, dated Jul. 20, 2012, 14 pages.

* cited by examiner

UPSELLING TO CUSTOMERS FOLLOWING INITIAL ONLINE PURCHASE

CROSS-REFERENCE TO RELATED APPLICATION

This application is a continuation of U.S. patent application Ser. No. 12/751,832 filed Mar. 31, 2010, which is hereby incorporated by reference in its entirety.

BACKGROUND

This invention relates generally to electronic commerce (e-commerce), and more particularly to providing an efficient vendor upsell purchase flow for offering products to customers following an initial purchase of a product.

Upselling is the practice of suggesting an additional service or product to a customer who is already purchasing a product in order to make a more profitable sale. The additional service or product provided during an upsell may be of higher value, lower value, or of equivalent value to the product being purchased by the customer. In a conventional e-commerce system, an upsell is provided to a customer after he or she has already added a product to an electronic shopping cart and is about to purchase the product. Before purchasing the product, the system may suggest one or more additional products to the customer to add to the shopping cart. For example, if a customer is purchasing a cellular telephone, a conventional e-commerce system may advertise to the customer a case for the cellular phone and/or a Bluetooth headset, in attempt to make a more profitable sale. If the customer decides to purchase the case and Bluetooth headset, these items are added to the shopping cart.

The upselling scheme of conventional e-commerce systems described above suffers from several deficiencies. By suggesting additional products to add to a customer's shopping cart, the sale of the original product is at risk. For example, the customer may only have sufficient funds to purchase the original item in the shopping cart. By adding the additional products to the shopping cart, the customer's budget may be exceeded and thereby result in a decline of the transaction due to insufficient funds. As a result, the sale of the original product is lost. Moreover, the upsell flow creates additional steps (e.g., web page jumps) between the addition of the initial product and the purchase of that product. It is well known that additional steps in the flow of an online transaction reduce the likelihood that the transaction will be completed.

Furthermore, traditional upselling schemes are not able to accurately gauge a customer's spending budget. By adding additional products to a customer's shopping cart, the total purchase price for the products may grow significantly in comparison to the purchase price of the product the customer originally intended to buy. Thus, in conventional e-commerce systems, it is difficult to determine how much a customer can spend due to the difference in total cost of the original product relative to the total cost of the original product in addition to the cost of the products advertised in the upsells.

SUMMARY

Embodiments of the invention provide an upsell purchase flow in an e-commerce system comprising an online marketplace server and one or more vendors. After a customer has purchased a product from a vendor, the customer is provided with one or more upsell opportunities during an upsell purchase flow. The upsell opportunity may be presented by navigating the customer's browser to an upsell pitch page provided by a vendor, which advertises the upsell product. By providing the upsell opportunities after the initial sale has been completed, the upsell does not interfere with or otherwise jeopardize that initial sale. If multiple upsell opportunities are presented to the customer, the flow may complete the purchase transaction for each upsell opportunity before moving on to the next. In this way, each purchase is "locked in" before another upsell suggestion is made, thereby capturing maximum value from the customer without having to guess at the "right" amount or value of upsell opportunities to offer the customer.

In one embodiment, the upsell purchase flow is based on an upsell decision tree that is associated with the initial purchased product. The upsell decision tree may describe which upsell products (i.e., upsell opportunities) the customer is provided and the order in which those products are to be offered. In one embodiment, the order is based on whether the purchase of an upsell product in an upsell is accepted or declined, so that the customer's actions of accepting or declining to purchase an upsell product may affect the subsequent upsell products that are offered. In one embodiment, vendors may define an upsell decision tree that includes up to a certain maximum number of upsell opportunities for a given upsell purchase flow. Thus, the vendors have control over what upsells are included in a upsell purchase flow and the number of upsells to provide to customers. Once the entire upsell purchase flow is complete, the customer is provided a receipt page that lists the product or products that have been purchased and provides a link for obtaining those products (if the products are electronically downloadable).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Customer Experience

Figure 1:
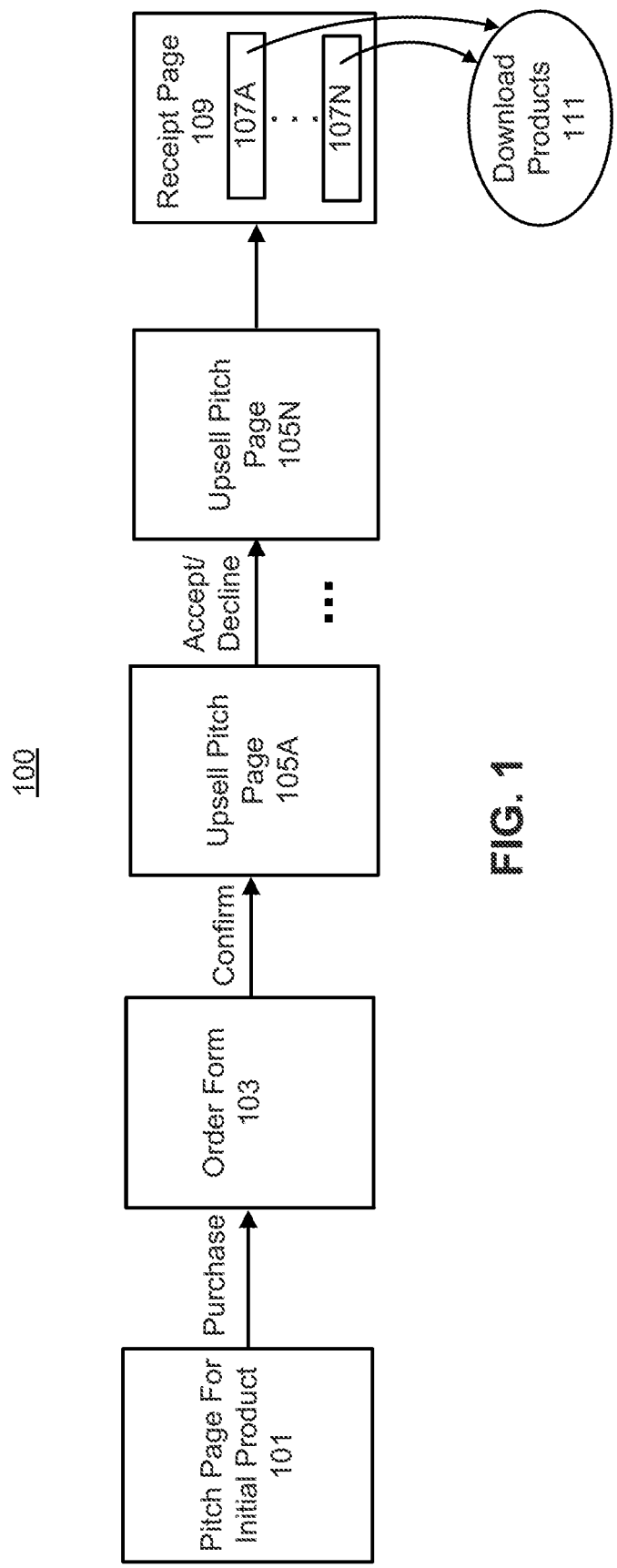
FIG. 1 is a diagram illustrating a customer's experience of upselling in according with an embodiment of the invention.

FIG. 1 illustrates the general customer experience 100 when presented one or more upsell opportunities during an upsell purchase flow in accordance with one embodiment. The customer views a vendor's pitch page 101 for an initial product that the customer requested. The product in the vendor's pitch page is considered the "initial product" because it is the product the customer initially intended to purchase. In one embodiment, a product's pitch page describes the product in detail and includes advertising content that persuades customers to purchase the product. For example, a pitch page for an electronic cooking book may include a summary of the recipes included in the cooking e-book, customer testimonials of the cooking e-book, and videos about the e-book. The pitch page also includes a mechanism to purchase the product such as an "Order Now" button.

Responsive to the customer indicating that he or she wants to purchase the initial product (e.g., clicking the Order Now button), the customer is displayed an order form 103. The customer fills out the order form with information such as payment information used to purchase the initial product. After confirming the purchase (i.e., purchasing the initial product), the customer is displayed the vendor's upsell pitch pages 105A through 105N. In one embodiment, an upsell is a vendor's pitch (i.e., advertisement) to sell an additional product to a customer via an upsell pitch page 105A through 105N. Note that upsell opportunities will be described in further detail below. If the customer views multiple upsell pitch pages, each upsell pitch page is only displayed after the customer has either accepted or declined the upsell product of the previous upsell pitch page.

Once the customer is presented with upsell pitch pages 105A through 105N, the customer is displayed a receipt page 109. A receipt page comprises the name of the product or products purchased by a customer during the upsell purchase flow 100, the cost of each product, an order number for each purchased product, and one or more download uniform resource locators (URLs) 107A through 107N for each purchased product according to one embodiment. The customer downloads 111 the purchased products using the download URLs.

System Overview

Figure 2:
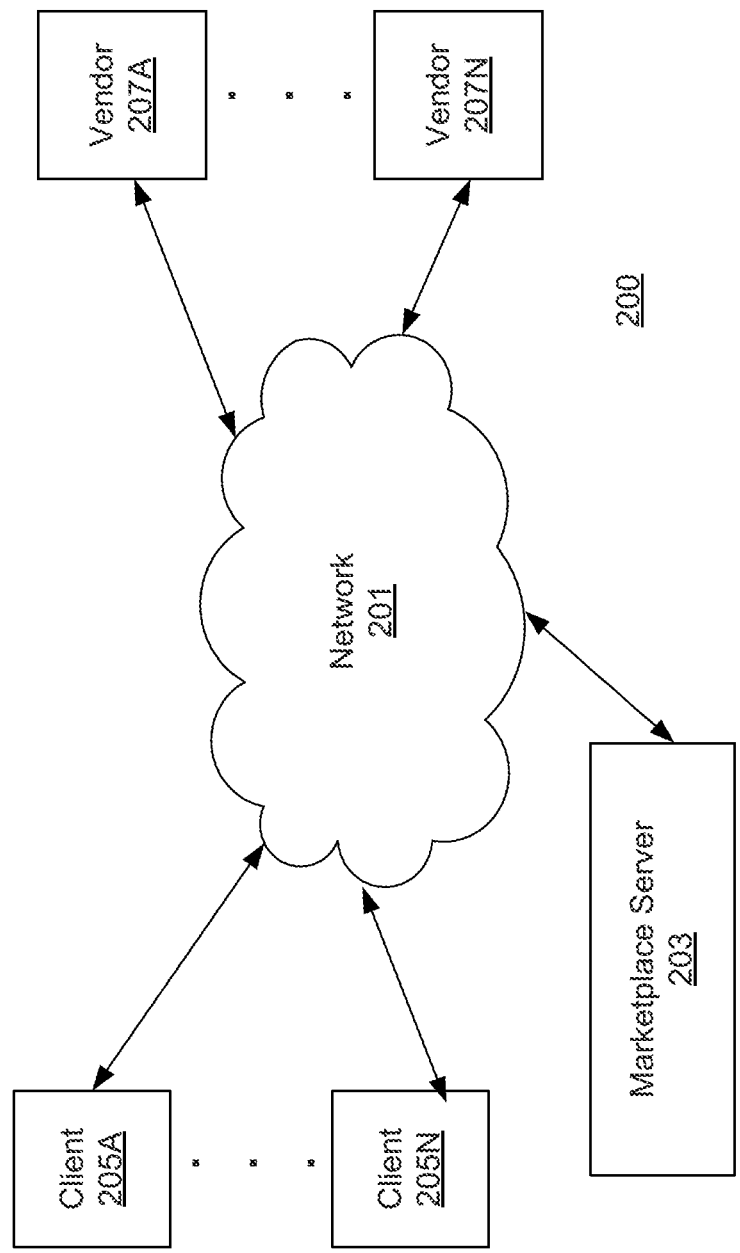
FIG. 2 is a diagram of a computing environment of an electronic commerce (e-commerce) system in accordance with an embodiment of the invention.

FIG. 2 illustrates an exemplary environment 200 for providing upsell opportunities in an e-commerce environment. One or more customers at clients 205A through 205N are in communication with a marketplace server 203 and one or more vendors 207A through 207N via a network 201. Embodiments of the computer environment 200 may have thousands or millions of clients 205 and vendors 207 connected to the marketplace server 203 via the network 201.

The client 205, for example, may be a personal computer comprising a web browser, which allows the customer to communicate with the marketplace server 203 and vendors 207. In other embodiments, the client 205 is a network-capable device other than a computer, such as a personal digital assistant (PDA), a mobile telephone, a television "set-top box," etc. The network 201 enables communications between the marketplace server 203, vendors 207 and clients 205. In one embodiment, the network 201 uses standard communications technologies and/or protocols. Depending upon the embodiment, the network 201 may include links to or comprise other networks, such as the Internet.

Generally, the marketplace server 203 facilitates purchase transactions between customers at clients 205 and vendors 207 and directs customers to upsell products provided by vendors 207. In alternative embodiments, the marketplace server 203 may also be considered a vendor 207 and provide the functionality of a vendor 207 as described herein. A suitable website provided by the marketplace server is found at www.clickbank.com. In one embodiment, an affiliate of the marketplace server 203 may advertise a vendor's products on his or her website. An affiliate is a person or entity that receives commission from vendors 207 for products purchased through the affiliate's website. Additionally, the marketplace server 203 advertises products sold by vendors 207 on the website provided by the marketplace server 203. In one embodiment, the products are digital products such as electronic books (e-books), downloadable software, and/or online services such as online gambling. In other embodiments, the products may include any type of product or service for which a transaction may be made online, including financial products and services or subscriptions or shippable products.

In one embodiment, the marketplace server 203 provides customers receipt pages for purchases made at vendors 107. As previously mentioned, a receipt page comprises the name of the product or products purchased by a customer, the cost of each product, an order number for each purchased product, and a download URL for each purchased product according to one embodiment. Selecting the download URL causes a customer's client 205 to access the purchased product associated with the download URL. In one embodiment, accessing a purchased product comprises downloading the product if the product is a digital product or being granted access to use the digital product or service. Note that other information may be included in the receipt page according to other embodiments such as a shipping address and/or shipment tracking information if the purchased products are shippable. In one embodiment, the receipt page may include a link to a "Thank You" page rather than a download URL if the purchased product is shippable. The "Thank You" page may thank the customer for purchasing the shippable product.

In one embodiment, vendors 207 are entities that sell products to customers. Vendors 207 work in conjunction with the marketplace server 203 and with affiliates to sell products to customers. Each product sold by a vendor 207 has an associated pitch page, a download URL, and set of upsell opportunities which will each be described in further detail below. In one embodiment, each pitch page is associated with a pitch page URL that links to the pitch page. Typically, the pitch page URL is displayed on the marketplace server 207's website, in an affiliate's website, and/or a vendor's website for advertisement purposes. In one embodiment, a hoplink is displayed on an affiliate's website. A hoplink is a web address that directs customers who click on the hoplink to a vendor's website according to one embodiment. The hoplink includes customized information that describes information about the affiliate who is responsible for the customer visiting the vendor's website. Because the hoplink includes information about the affiliate, it ensures that if a customer ends up purchasing a product on a vendor's website via the hoplink, the affiliate that posted the hoplink receives commission for the purchase transaction.

Each product is also associated with a download URL. As described previously, products provided by vendors 207 are typically digital products. After a customer purchases a product, the marketplace server 107 provides a download URL to the customer so that the customer may download the purchased product.

Lastly, each product sold by a vendor 207 is associated with a set of upsell opportunities. An upsell opportunity (herein an "upsell") is a vendor's pitch (i.e., advertisement) to sell an additional product to a customer via a pitch page.

The upsell may be an additional product that is more expensive, less expensive, or of equal value to the initial item purchased by the customer. Generally, after a product (i.e., the initial or original product) is purchased via an affiliate's website, the vendor's website, or through the marketplace server 203's website, the marketplace server 203 directs the customer to a set of upsells provided by the vendor 207. In one embodiment, the set of upsells is associated with the initial product purchased by the customer. In one embodiment, a set of upsells may only include a set number of upsells, such as three upsells, so that the customer's purchasing experience is not degraded by being provided with a large number of upsells.

In one embodiment, when a vendor 207 displays an upsell to a customer, the customer's acceptance of the upsell causes the upsell product advertised in the upsell to be purchased at that instance rather than simply adding the upsell product to an electronic shopping cart. That is, the customer is charged (i.e., billed) for the purchase of the upsell product responsive to a selection of a "Buy Now" button, for example. By charging the customer for the upsell product at that instance, it is ensured that the customer has sufficient funds to purchase the upsell product advertised in the upsell thereby capturing maximum value from the customer before the customer is provided with another upsell.

According to one embodiment, each product sold by a vendor 207 has an associated upsell decision tree that is customized by the vendor 207. An upsell decision tree describes the sequence (i.e., order) in which a set of upsells are provided to a customer and is configured by the vendor 207 providing the set of upsells. Thus, the vendors 207 customize the upsells provided to customers and control the order in which the upsells are displayed. Note that an upsell decision tree associated with a product can be modified at any time by the vendor 207 that defined the upsell decision tree. This beneficially allows the vendor 207 to custom tailor which upsells are provided to customers after reviewing customer responses to provided upsells. Additionally, the upsells provided in an upsell decision tree are not limited to upsells provided by the vendor 207 that configured the tree. In one embodiment, the vendor 207 configuring the decision tree may collaborate with one or more other vendors 207 and may include in the decision tree upsells provided by the other vendors 207 thereby resulting in a multi-vendor upsell decision tree.

Generally, the upsell decision tree is a set of instructions that the marketplace server 203 and vendor 207 follow in order to provide a set of upsells to a customer. In one embodiment, the upsells associated with the upsell decision tree are upsells that are specifically chosen by the vendor 207 that configured the decision tree. In alternative embodiments, the upsells may be selected at random by the vendor 207. Furthermore, for each upsell included in an upsell decision tree, the vendor 207 that configured the tree provides an indication of how much commission to pay to an affiliate responsive to a customer purchasing an upsell product described by the upsell. Thus, the vendor 207 controls the amount of money an affiliate receives as a result of a sale of a vendor's product through the affiliate's website or as a result of a customer purchasing an upsell associated with a product that was referred by the affiliate.

Once the vendor 207 has configured an associated upsell decision tree for a product, the vendor 207 sends the upsell decision tree to the marketplace server 203 along with an upsell flow identifier (ID) that identifies the decision tree. Responsive to a customer purchasing a product, the marketplace server 203 accesses the upsell decision tree associated with the product based on the upsell flow ID to determine which upsell products and pitch pages the customer should be redirected to next based on the decision tree.

In one embodiment, an upsell decision tree is a tree-like graph that describes the display sequence of a set of upsells. Each node in the tree is either an action node that describes an action performed by the vendor 207 or a decision node describing a decision made by a customer. Specifically, the decision nodes describe customer decisions whether an upsell is accepted (i.e., purchased) or declined. In one embodiment, the performance of each action described by an upsell decision tree is dependent on a preceding decision made by a customer. That is, the next upsell that the customer is directed to is dependent on whether the customer accepted or declined the upsell that was previously displayed to the customer. In one embodiment, only the first action node in the tree is not dependent on a customer decision.

As mentioned above, the first node in the upsell decision tree is an action node. The action node describes the first upsell that should be provided to a customer responsive to a customer purchasing a product associated with the upsell decision tree. In one embodiment, the action node includes a URL to a vendor's upsell pitch page and an instruction for the marketplace server 203 to redirect the customer to the vendor's upsell pitch page described by the action node.

The action node is connected to a decision node by a branch. The decision node describes whether the customer accepted or declined the first upsell described by the first action node. Regardless of whether the first upsell is accepted or declined, the decision tree has two proceeding action nodes that either corresponds to the customer accepting the first upsell or declining the first upsell. In one embodiment, either action node may describe the action of displaying a receipt page indicating the product(s) that have been purchased or may be one of the following:

An upsell describing a new product that is more expensive than the product in the previous upsell;
 An upsell describing a new product that is cheaper than the product in the previous upsell; or
 An upsell describing the product in the previous upsell at a lower price than the previous upsell;
 An upsell describing a product that is equivalent in price to the product in the previous upsell; or
 An alternative product from a different vendor.

Following each action described above is a corresponding decision node. The levels of the decision tree alternate between action nodes to decision nodes until the vendor 207 has displayed to a customer a set number of upsells. Once the set number of upsells is reached, the upsell purchase flow stops. For example, once the vendor 207 has displayed three upsells, the vendor 207 stops providing upsells to the customer. At that point, regardless of whether the customer accepted or declined the last upsell in the upsell decision tree, the marketplace server 203 provides the customer with a receipt page.

Figure 3:
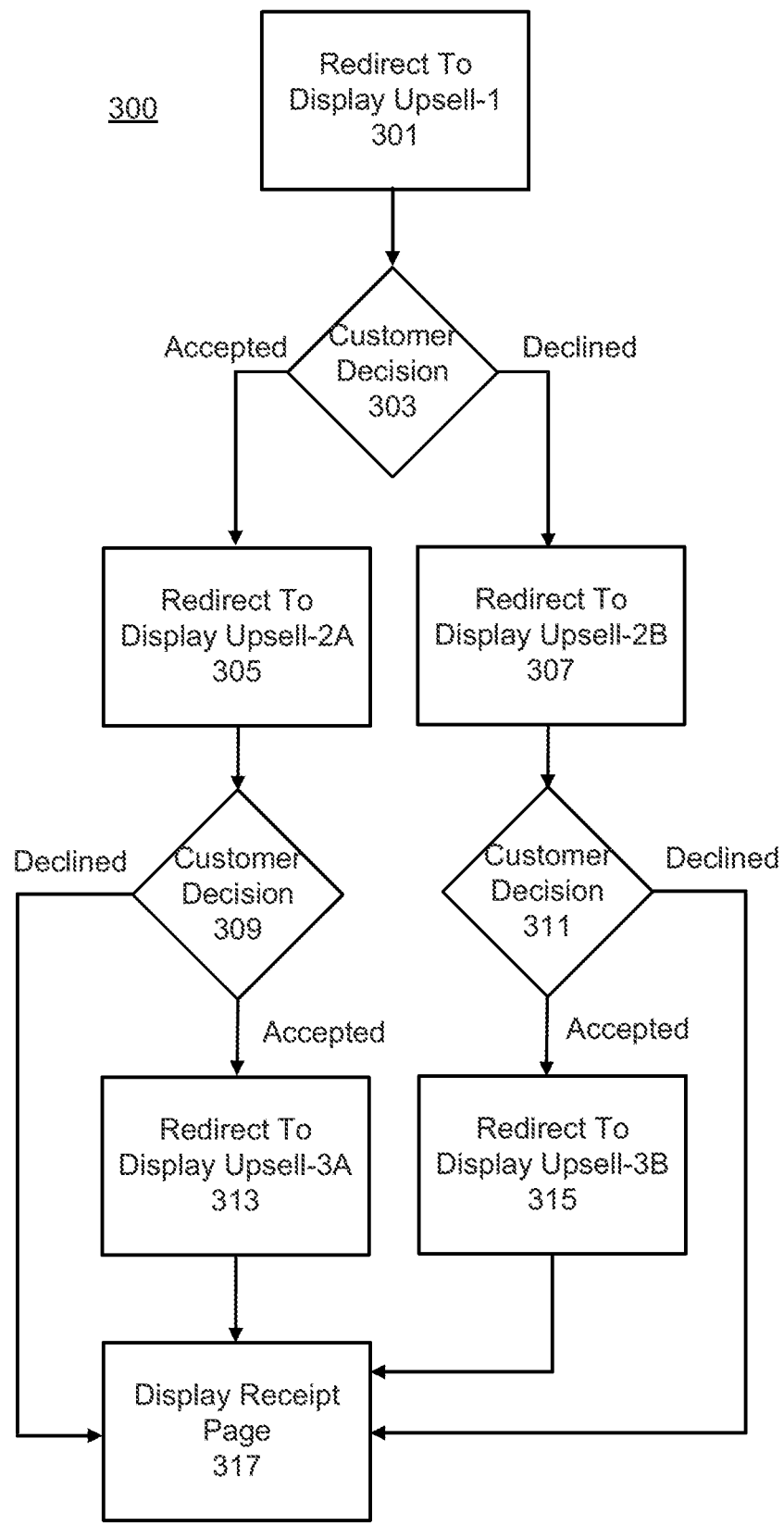
FIG. 3 is a diagram illustrating an upsell decision tree in accordance with an embodiment of the invention.

Refer now to FIG. 3 that describes an example of an upsell decision tree 300 according to one embodiment. Note that in FIG. 3, action nodes in the upsell decision tree are represented by rectangles and decision nodes are represented by diamonds. Other shapes may be used to represent action nodes and decision nodes in alternative embodiments.

The order and number of upsells displayed in the upsell decision tree 300 are only used for exemplary purposes and the vendor 207 that configures an upsell decision tree may configure the order and number of upsells displayed to a customer. However, as mentioned previously a vendor 207, may only provide a customer up to a maximum number of upsells to a customer. In this example, the vendor may only display a maximum of three upsells to a customer.

The upsell decision tree 300 indicates to the marketplace server 203 to redirect the customer to the vendor 207 for display 301 of upsell-1. Next, the customer's decision 303 is made whether to accept or decline upsell-1. If the customer accepted upsell-1, the upsell decision tree 300 instructs the marketplace server 203 to redirect the customer to the vendor 207 for display 305 of upsell-2A. However, if the customer declined upsell-1, the marketplace server 203 redirects the customer to the vendor 207 for display 307 of upsell-2B.

If the vendor 207 displays the customer upsell-2A, the customer's decision 309 is made whether to accept or decline upsell-2A. If the customer declines upsell-2A, the marketplace server 203 displays 317 the customer the receipt page indicating the products that the customer purchased. If the customer accepted upsell-2A, the marketplace server 203 redirects the customer to the vendor 207 for display 313 of upsell-3A. Since the vendor 207 may only display the customer a maximum of three upsells in this example, the marketplace server 203 displays 317 the customer a receipt page regardless of whether the customer accepted or declined upsell-3A.

The marketplace server 203 performs similar steps responsive to the display of upsell-2B. The customer's decision 311 to accept or decline upsell-2B is made. If the customer declined upsell-2B, the marketplace server 203 displays 317 the receipt page to the customer. However, if the customer accepted upsell-2B, the marketplace server 203 redirects the customer to the vendor 207 for display 315 of upsell-3B. Regardless of whether the customer accepted or declined upsell-3B, the marketplace server 203 displays 317 the customer the receipt page 317 since the maximum number of upsells that may be displayed to a user has been reached.

Upsell Pitch Pages

In one embodiment, to provide an upsell to a customer, the marketplace server 203 redirects the customer to the vendor 207 for display of an upsell pitch page. That is the marketplace server 203 directs the customer to the appropriate upsell provided by a vendor 207 based on an upsell decision tree. Each upsell pitch page comprises:

- A price of a product associated with the upsell;
- At least one accept (i.e., purchase) mechanism such as a link or button to accept the purchase of the product for the displayed price;
- A description associated with the accept mechanism that explicitly indicates that selecting the accept mechanism will cause the product to be purchased at that instance. Acceptable phrases that highlight this fact include "Purchase Now," "Buy Now," or any other variations that indicate that the customer is purchasing the product as a result of selecting the accept mechanism rather than simply adding the product to an electronic shopping cart;
- A prominent decline mechanism near the accept mechanism such as a link or button to decline the purchase of the product; and
- A prominent decline mechanism at the bottom of the upsell pitch page to decline the purchase of the product.

In one embodiment, the accept mechanism and decline mechanism are each associated with a paylink. Responsive to a customer selecting an accept mechanism or a decline mechanism, the paylink associated with the selected mechanism is transmitted to the marketplace server 203 for processing. In one embodiment, a paylink comprises a URL that describes whether a customer purchased a product in an upsell. The URL directs the customer's selection of whether to accept or decline an upsell to the marketplace server 203 such that the marketplace server 203 receives the customer's selection of a paylink rather than the vendor 207 receive the selection.

The paylink comprises two parameters according to one embodiment. The first parameter, describes a customer's response to an upsell. That is, the first parameter describes whether a customer accepted or declined a product in an upsell. In one embodiment, the first parameter is represented by the term "cbur." For example, cbur is equal to value "a" indicates that the customer accepted an upsell. In contrast, cbur is equal to value "d" indicates that the customer declined the upsell. Note that in other embodiments, other terms may be used to represent the first parameter and other values may be used to designate whether an upsell was accepted or declined.

The second parameter included in a paylink is a session identifier. According to one embodiment, the second parameter is represented by the term "cbf." Other terms may be used to represent the second parameter in different embodiments. The session identifier is a unique identifier associated with the initial purchase made by a customer. Thus, the session identifier included in each paylink of each pitch page in an upsell purchase flow is unique to that instance of the pitch page. The session identifier is used to prevent cookie-less (i.e. a HTTP cookie) customers from dropping out of the upsell purchase flow and placing duplicate orders of products during the upsell purchase flow. This occurs if a customer uses the back button on his or her browser after being displayed one or more upsells. The customer is not allowed to backtrack the purchase flow and go down an alternative path in the upsell decision tree.

For example, if a customer declines a first upsell, the customer is provided with a second upsell. The customer may decide that he or she wants to purchase the product in the first upsell and may press the back button to make the purchase of the first upsell. However, since the decline mechanism from the first upsell was previously selected, the corresponding paylink with the customer's response to the first upsell and a session identifier have already been transmitted to the marketplace server 203. Because each pitch page has a specific session identifier, the marketplace server 203 may track where the customer is in the upsell decision tree using the session identifiers in order to prevent the user from going down different paths in the upsell decision tree. In one embodiment, responsive to the user attempting to purchase the product in the first upsell that was originally declined, the marketplace server 203 may transmit a message to the customer stating that the purchase is not possible and only the next upsell in the upsell decision tree or a receipt page indicating the products that have been purchased may be displayed.

In one embodiment, the vendor 207 has an option to disable the use of the session identifier parameter. If customers also have their cookies disabled in addition to the vendor disabling the use of the session identifier parameter, the marketplace server 203 does not redirect these customers to the vendor 207 for upsells. Rather, after a purchase of an initial product from the vendor 207, these customers are provided a receipt page for the initial product that was purchased rather than be provided upsell pitch pages. This scheme is used in order to prevent customer confusion and performance degradation.

According to one embodiment, below are two example paylinks:
- http://3.somenick.pay.clickbank.net?cbur=a&cbf=<insert session identifier value>
- http://3.somenick.pay.clickbank.net?cbur=d&cbf=<insert session identifier value>

In the first example, the paylink represents a paylink for the accept mechanism. Here, cbur is equal to "a" which indicates that a customer accepted the purchase of a product in an upsell and cbf is equal to the session identifier associated with the transaction. In contrast, in the second example, the paylink represents a paylink for the decline mechanism. In this example, cbur is equal to "d" which indicates that the customer declined the purchase of the product in the upsell.

Upsell Purchase Flow Interaction Diagram

Figure 4:
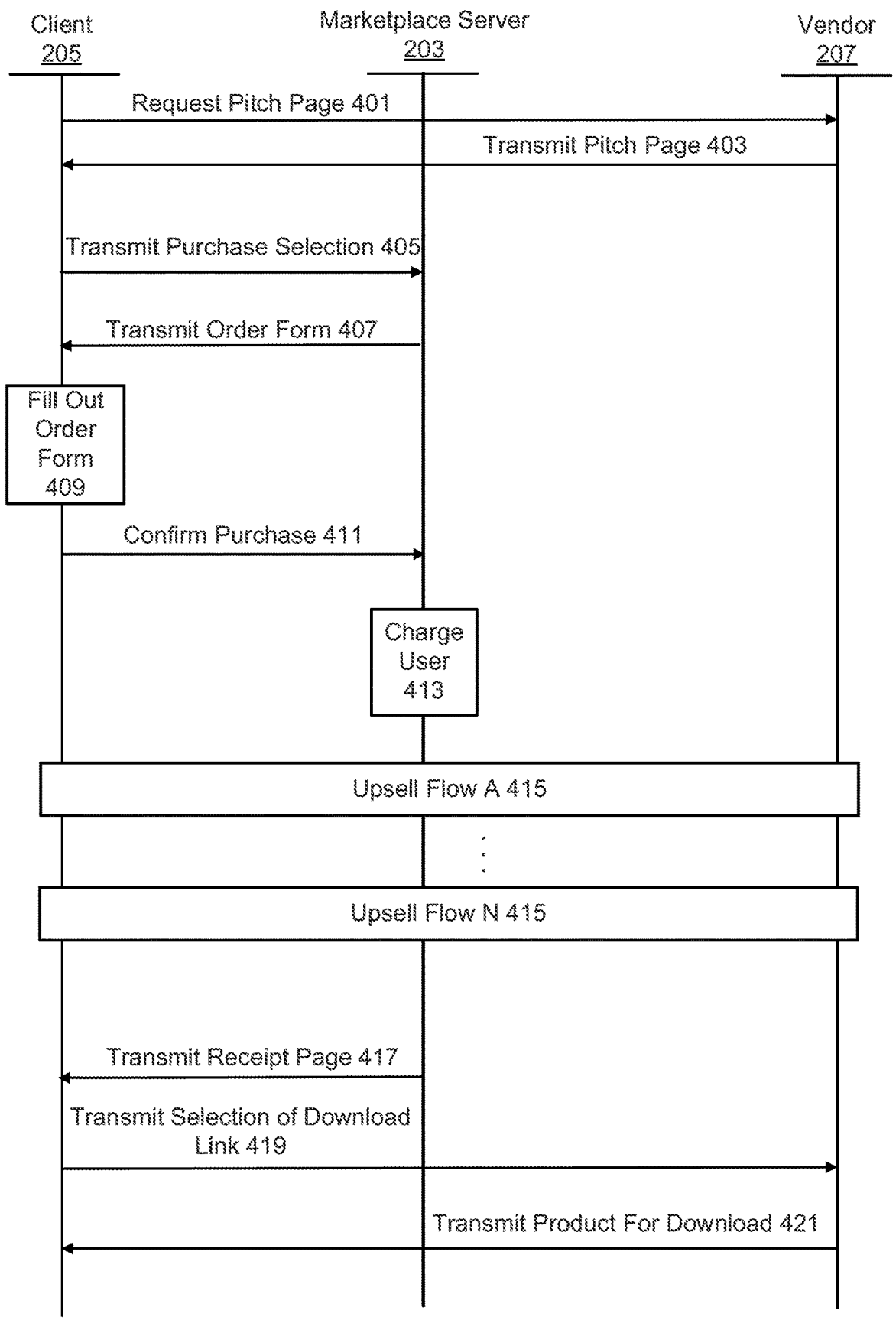
FIG. 4 is an interaction diagram describing an upsell purchase flow within the e-commerce system in accordance with an embodiment of the invention.
Figure 5:
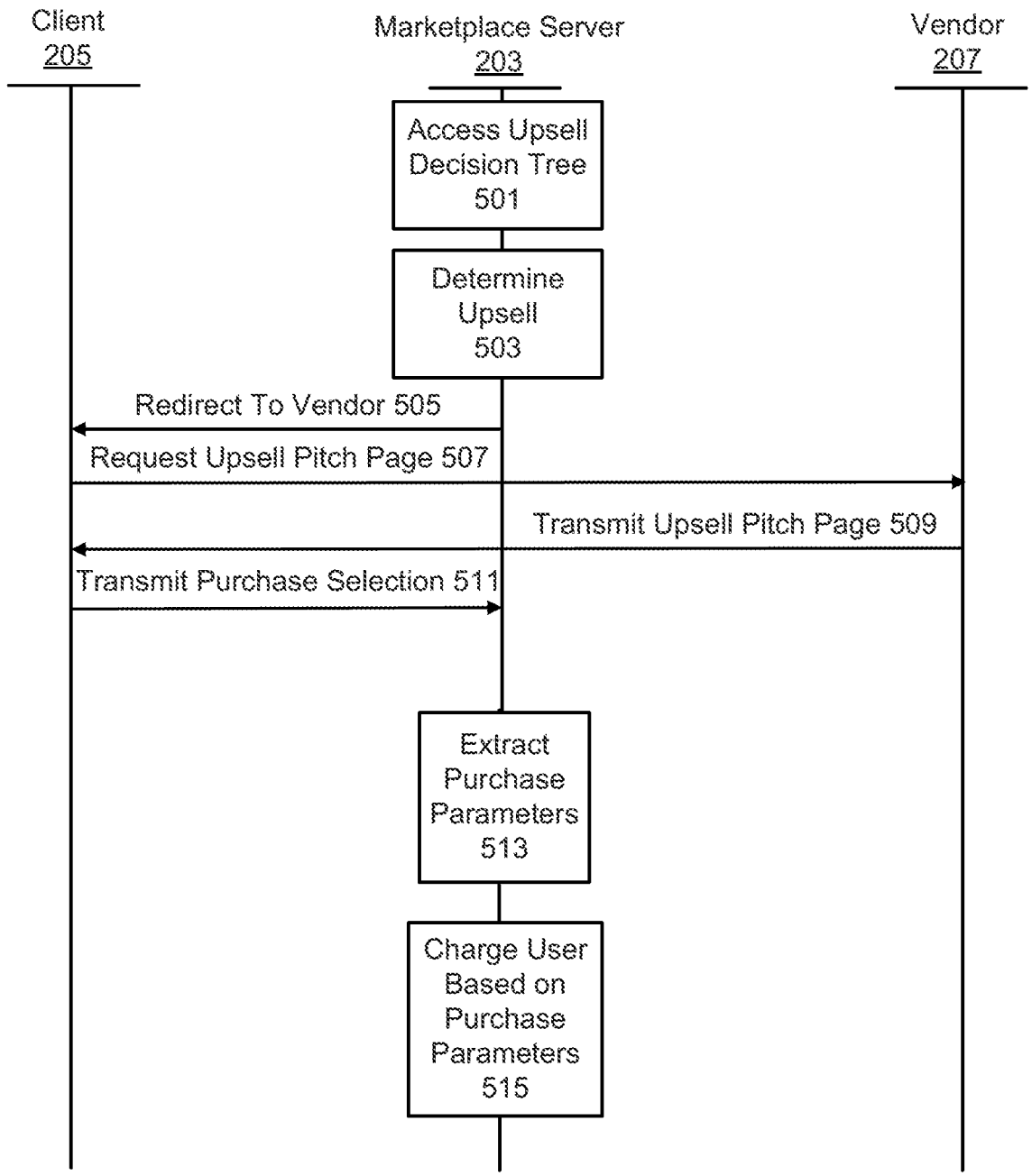
FIG. 5 is an interaction diagram describing the steps performed when providing an upsell to a client in accordance with an embodiment of the invention.

Generally, FIGS. 4 and 5 are interaction diagrams illustrating the interaction between a client 205, the marketplace server 203, and a vendor 207 during an upsell purchase flow according to one embodiment. Those of skill in the art will recognize that other embodiments may perform different and/or additional steps other than those performed in FIGS. 4 and 5.

FIG. 4 describes the interactions that occur between a client 205, marketplace server 203, and a vendor 207 during an upsell purchase flow responsive to a customer using client 205 to make a purchase of a product from the vendor 207. In one embodiment, the client 205 requests 401 a pitch page of a product from the vendor 207. The pitch page may be requested by the client 205 responsive to the customer clicking a link that causes the client 205 to request the pitch page of the product from vendor 207. The link to the product may be displayed on either an affiliate's website, a vendor's website, or the website provided by the marketplace server 203. Responsive to receiving the request for the pitch page, the vendor 207 transmits 403 the pitch page to the client 205 that requested the page.

As previously described above, the pitch page is an advertisement for a specific product and indicates a price for the product described by the pitch page. If the user decides to purchase the product described by the pitch page, the customer may click on a purchase mechanism such as a "Add To Cart" or "Buy Now" button which causes the client 205 to transmit 405 the customer's purchase selection to the marketplace server 203. Responsive to receiving the purchase selection, the marketplace server 203 transmits 407 the order form to the client 205. As previously described, the order form indicates the product that the customer is purchasing as well as the total price for the product. In some embodiments, the total price includes sales tax as well as shipping costs if applicable. In alternative embodiments, a vendor 207 may want to receive the customer's purchase selection of the initial product. In this embodiment, the purchase selection is transmitted to the vendor 207. The vendor 207 then redirects the client 205 to the marketplace server 203 to receive the order form to purchase the initial product. That is, after receiving the redirect from the vendor 207, such as a HTTP redirect, the client 205 request an order form from the marketplace server 203 based on the redirect.

The customer at client 205 then fills 409 out the order form. The information that the customer provides in the order form includes the customer's payment information such as a credit card number, credit card expiration date, name on the credit card, and billing address. In addition to payment information, in other embodiments other information may be provided such as a shipping address, banking information, or payment account information (e.g., PayPal account information). Once the customer has completed the order form, the customer confirms 411 the purchase of the product by transmitting the order form to the marketplace server 203. By confirming the purchase, the customer agrees to purchase the product for the amount indicated in the order form. Once the marketplace 103 server receives the order form, the marketplace server 203 charges 413 the customer for the total price of the product using the billing information included in the order form. That is, the marketplace server 203 completes the transaction for the customer's purchase of the product. Note that in other embodiments, charging the customer includes indirect methods that may or may not be performed by the marketplace server 203 for charging the customer.

Once the marketplace server 203 has charged the customer for the product, the marketplace server redirects the client 205 to request a specific set of upsells from the vendor 207. As described above, each product is associated with a set of upsells. The marketplace server 203 determines the set of upsells associated with the purchased product based on an upsell flow ID received during the customer's indication to purchase the initial product. In one embodiment, the upsell flow ID identifies the upsell decision tree associated with the initial product. The marketplace server 203 then redirects the customer to vendor 207 thereby requesting the set of upsells 415 A through N. The upsell purchase flow will be described below in further detail with respect to FIG. 5.

Once the upsell purchase flow is completed, the marketplace server 203 transmits 417 the receipt page to the client 205. The receipt page indicates to the customer the product(s) the customer has purchased as well as a download link to each product that was purchased. The receipt page may only include a download link for the initial product that was purchased as well as one or more download links for products that were purchased from the set of upsells transmitted from the marketplace server 203 based on whether the customer accepted an upsell.

The customer may then select a download link from the receipt page that causes the client 205 to transmit 419 the selection of the download link to the vendor 207. After receiving the selection of the download link, the vendor 207 transmits 421 the product associated with the download link to the client 205 for download.

FIG. 5 describes the interactions that occur between the client 205, the marketplace server 203, and the vendor 207 during an upsell purchase flow. Specifically, FIG. 5 describes the interactions that occur between the client 205, the marketplace server 203, and the vendor 207 after the marketplace server 203 charges the customer for the initial product as described in FIG. 4. Note that the steps in FIG. 5 describing the interaction between the client 205, marketplace server 203, and vendor 207 are repeated for each upsell 419 transmitted to the client 205 from vendor 207.

Responsive to the customer being charged for the initial purchase, the marketplace server 203 accesses 501 the upsell decision tree associated with the purchased product that describes which upsells to provide to the customer. The marketplace server 203 determines 503 from the upsell decision tree which upsell to transmit to the customer. In the context of FIG. 4, the marketplace server 203 determines the first upsell (upsell A) to provide to the customer from the upsell decision tree. Once the upsell is determined, the marketplace server 203 redirects 505 the client 205 to a URL address of the vendor 505 where the client 205 can obtain the determined upsell. The client 205 requests 507 from the vendor 207 the upsell pitch page associated with the upsell determined by the marketplace server 203. The vendor 207 transmits 509 the upsell pitch page requested by the client 205. The customer reviews the upsell pitch page that describes an additional product for purchase. As described previously, the customer may accept the purchase of the product in the upsell by selecting the accept mechanism in the upsell pitch page or may decline the purchase of the product by selecting the decline mechanism in the upsell pitch page.

Once the customer selects either the accept mechanism or the decline mechanism, the client 205 transmits 511 the customer's selection to the marketplace server 203. As mentioned above, both the accept mechanism and decline mechanism are associated with paylinks that directs a customer's selection to the marketplace server 203 rather than vendor 207. Also, as described previously, the paylink includes parameters that describe whether the upsell was accepted or declined as well as the session identifier associated with the transaction. Thus, even if the customer declined an upsell, the client 205 still transmits a paylink to the marketplace server 203 describing the customer's selection.

Once the marketplace server 203 receives the paylink, the marketplace server 203 extracts 513 the purchase parameters from the paylink. In one embodiment, the marketplace server 203 may use a dynamic programming language such as Perl, PUP, Java/JSP, or ASP to extract the parameters in the paylink. For example, to extract the parameter, the marketplace server 203 may use a PUP commands such as $_REQUEST['cbur'] and $_REQUEST['cbf'] to extract the parameters in the paylink.

The marketplace server 203 then charges 515 the customer based on the purchase parameters included in the paylink. If the paylink indicates that the customer accepted the upsell, the marketplace server 203 uses the session identifier included in the paylink to determine the payment information used to make customer's initial purchase. The determined payment information is used to purchase the product in the upsell. As mentioned above, the steps described in FIG. 5 are repeated until the end of the upsell decision tree is reached.

Figure 6:
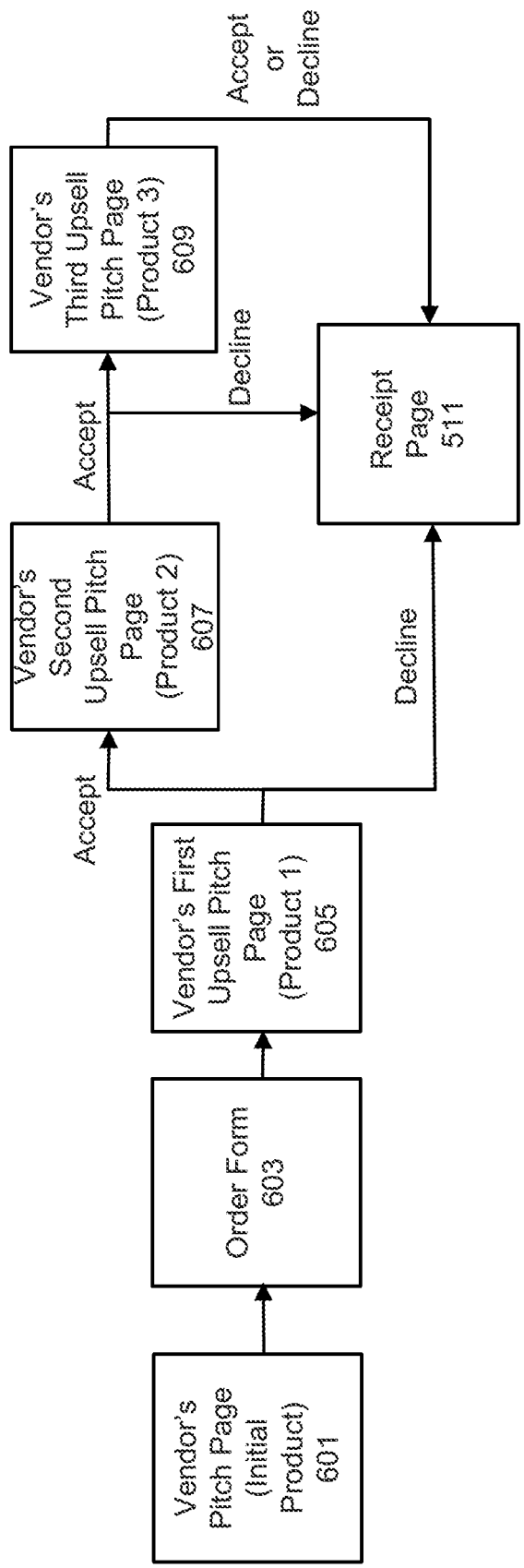
FIG. 6 is a diagram of upselling from a customer's perspective in accordance with an embodiment of the invention.
Figure 7:
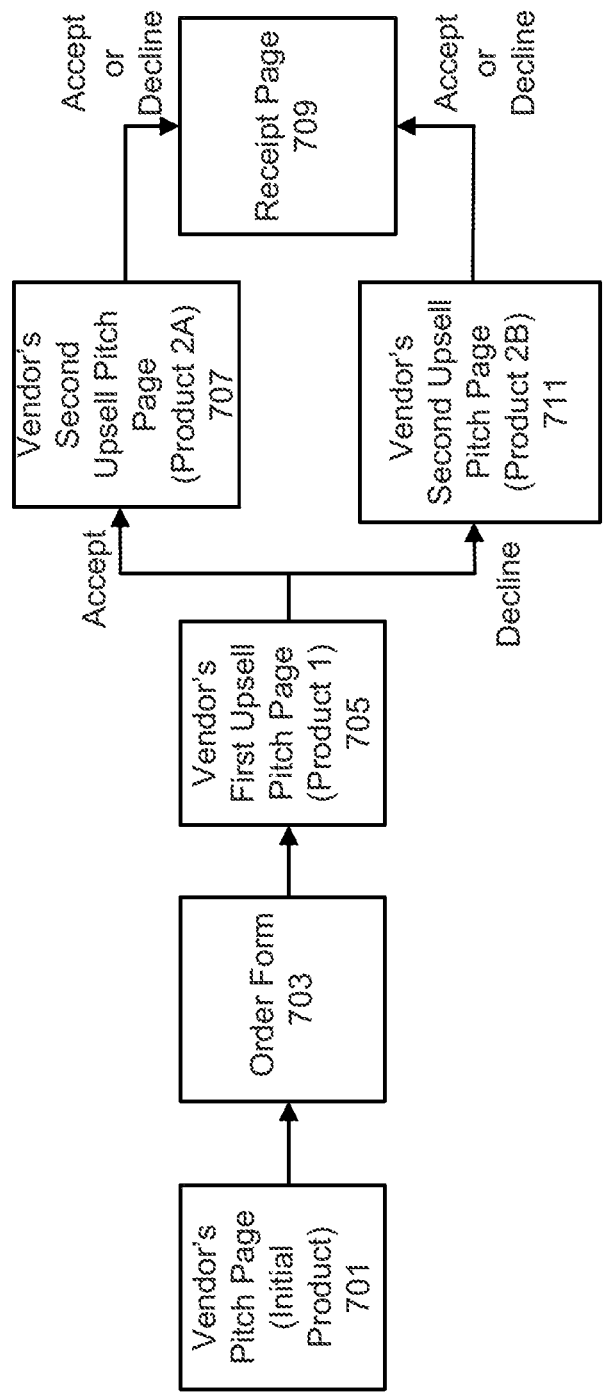
FIG. 7 is a diagram of another example of upselling from a customer's perspective in accordance with an embodiment of the invention.

FIGS. 6 and 7 are different embodiments of an upsell flow from a customer's perspective. Note that the upsell flow in FIGS. 6 and 7 are merely exemplary and different upsell flows may be used in different embodiments.

Referring to FIG. 6, a customer is displayed 601 a vendor's pitch page for a product that the customer has requested. Responsive to the customer indicating that he or she wants to purchase the product, the customer is displayed 603 an order form. Responsive to the order form being submitted, the customer is then displayed 605 the vendor's first upsell pitch page for a first product. The display of the first pitch page for the first product and the display of the remaining upsell pitch pages illustrated in FIG. 6 are based on an upsell decision tree associated with the initial product.

If the customer declines the vendor's first upsell pitch page, the customer is automatically displayed 611 a receipt page that includes only the purchased initial product and a link to download the product. However, if the customer accepts the upsell pitch page for the first product (i.e., purchases the first product), the customer is displayed 607 the vendor's second upsell pitch page for a second product. As previously described, the second product may be either higher in price or lower in price than the first product depending on the configuration of the upsell decision tree. The second product may also be of equal value. However, typically the customer is provided a higher priced product if the customer accepted the first upsell according to one embodiment in order to determine how much the customer is willing to spend. If the customer accepts the vendor's second upsell pitch page, the customer is displayed 609 the vendor's third upsell pitch page for a third product which may again be higher in price or lower in price than the preceding product depending on the configuration by the vendor 207. Regardless of whether the customer accepts or declines the vendor's third upsell pitch page, the customer is displayed a receipt page 611.

FIG. 7 is another embodiment of an upsell flow from a customer's perspective. Similar to the upsell flow in FIG. 6, a customer is displayed 701 a vendor's pitch page for a product that the customer has requested. Responsive to the customer indicating that he or she wants to purchase the product, the customer is displayed 703 an order form. Responsive to the order form being submitted, the customer is displayed 705 the vendor's first upsell pitch page for a first product. The display of the first pitch page for the first product (product 1) and the display of the remaining upsell pitch pages illustrated in FIG. 7 are based on an upsell decision tree associated with the initial product.

In this example, regardless of whether the customer accepts or declines the vendor's first upsell pitch page, the customer is displayed a second upsell pitch page. If the customer accepts the vendor's first upsell pitch page, the customer is displayed 707 the vendor's second upsell pitch page for a second product (product 2A). In this example, product 2A is more expensive than product 1 in order to gauge the amount of money the customer is willing to spend. However, if the customer declined the vendor's first upsell pitch page, the customer is displayed 711 the vendor's second upsell pitch page for a second product (product 2B) that is cheaper than the first product. The rationale behind displaying a cheaper product is that the customer may have declined the vendor's first upsell because the first product was too expensive. By providing a cheaper product, the vendor 207 anticipates that the cheaper product is within the customer's budget. In this example, regardless of whether the customer accepted or declined either the second upsell for product 2A or for product 2B, the customer is displayed 711 a receipt page.

Affiliate Commission

As mentioned previously, affiliates are people who receive commission from the vendors 207 for products purchased that are referred from their websites. The commission that an affiliate receives as a result of a sale of a product through the affiliate's website is designated by the vendor 207 of the purchased product. In one embodiment, the commission may be a flat fee or may be a percentage of the purchase price of the product.

In one embodiment, an affiliate associated with a sale of an initial product advertised or referred from the affiliate's website is injected in the upsell flow. That is, the affiliate receives commission for any upsell product purchased from a set of upsells provided to a customer that purchased the initial product through the affiliate's website. The commission may be a fixed amount (i.e., a flat fee or a percentage of the product) for each purchased product. Alternatively, the vendor 207 providing the commission may choose a different commission for each sale in an upsell.

For example, consider the scenario where a customer is displayed three upsells and the customer purchases the first two upsells. The vendor 207 may configure the commission such that the affiliate receives a commission of 50% of the total price of the upsell product in the first upsell and only receives 10% of the total price of the upsell product in the second upsell.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable storage medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method of providing upsells to a customer device, the method executed by a computer and comprising:
    completing a transaction for a customer's purchase of a downloadable digital product based on payment information included in an order form;
    responsive to completing the transaction:
        identifying a decision tree associated with the downloadable digital product, the decision tree describing a display order of one or more upsell pitch pages to be displayed on the customer device that describe one or more additional upsell products, wherein the one or more additional upsell products described by the decision tree are randomly selected or are specifically chosen by a vendor associated with the downloadable digital product, and
        providing a first upsell pitch page from the one or more upsell pitch pages to the customer device for display on the customer device based on the display order described in the decision tree, the first upsell pitch page describing a first upsell product;
    determining whether a selection of a mechanism accepting to purchase the first upsell product displayed in the first upsell pitch page, or a selection of a mechanism declining the first upsell product displayed in the first upsell pitch page is received from the customer device;
    responsive to determining that neither the selection of the mechanism accepting to purchase the first upsell product is received from the customer device, nor a selection of the mechanism declining the first upsell product is received fro m the customer device, refraining from sending a receipt page comprising a link to download the downloadable digital product, wherein the receipt page is provided to the customer device only after one of either the mechanism accepting the purchase of the first upsell product displayed in the first upsell pitch page and the mechanism declining to purchase the first upsell product displayed in the first upsell pitch page has been selected by the customer device.

2. The computer-implemented method of claim 1, further comprising:
    responsive to determining that the selection of the mechanism accepting the purchase of the first upsell product displayed in the first upsell pitch page is received from the customer device:
        receiving a paylink associated with one of the first upsell product, the paylink comprising purchase parameters;
        extracting the purchase parameters from the paylink, and
        charging the customer for the first upsell product based on the purchase parameters.

3. The computer-implemented method of claim 2, wherein the purchase parameters comprise a first parameter describing that the customer device indicated an acceptance of the purchase of the first upsell product or declined the purchase of the first upsell product and a second parameter describing an identifier associated with the customer's purchase of the downloadable digital product.

4. The computer-implemented method of claim 1, further comprising:
    transmitting a pitch page including advertising information associated with the downloadable digital product and a link to complete a purchase of the downloadable digital product; and receiving an indication of a selection of the link to complete the purchase of the downloadable digital product.

5. The computer-implemented method of claim 1, wherein the first upsell pitch page comprises an advertisement to sell the first upsell product to the customer and a price of the first upsell product in addition to the mechanism accepting to purchase the first upsell product and the mechanism declining the first upsell product.

6. The computer-implemented method of claim 1, wherein the receipt page further comprises a description of each purchased product and a link to access each purchased product.

7. The computer-implemented method of claim 1, further comprising:
responsive to receiving an indication describing that the first upsell product is accepted, automatically completing a transaction for the purchase of the first upsell product based on the payment information included in the order form.

8. The computer-implemented method of claim 1, wherein the first upsell product is either of higher value, lower value, or equivalent value than the downloadable digital product.

9. The computer-implemented method of claim 1, wherein the downloadable digital product and the one or more additional upsell products are downloadable digital products.

10. The computer-implemented method of claim 1, wherein the display order of the one or more upsell pitch pages described by the decision tree is customizable by a vendor associated with the decision tree.

11. The computer-implemented method of claim 10, wherein the one or more upsell pitch pages described by the decision tree are selected by the vendor and are associated with a plurality of vendors that are distinct from the vendor that customized the decision tree.

12. A non-transitory computer-readable storage medium storing executable code for providing upsells to a customer device, the code when executed by at least one computer processor causes the computer processor to perform steps comprising:
completing a transaction for a customer's purchase of a downloadable digital product based on payment information included in an order form;
responsive to completing the transaction:
identifying a decision tree associated with the downloadable digital product, the decision tree describing a display order of one or more upsell pitch pages to be displayed on the customer device that describe one or more additional upsell products, wherein the one or more additional upsell products described by the decision tree are randomly selected or are specifically chosen by a vendor associated with the downloadable digital product, and
providing a first upsell pitch page from the one or more upsell pitch pages to the customer device for display on the customer device based on the display order described in the decision tree, the first upsell pitch page describing a first upsell product;
determining whether a selection of a mechanism accepting to purchase the first upsell product displayed in the first upsell pitch page, or a selection of a mechanism declining the first upsell product displayed in the first upsell pitch page is received from the customer device;
responsive to determining that neither the selection of the mechanism accepting to purchase the first upsell product is received from the customer device, nor a selection of the mechanism declining the first upsell product is received from the customer device, refraining from sending a receipt page comprising a link to download the downloadable digital product, wherein the receipt page is provided to the customer device only after one of either the mechanism accepting the purchase of the first upsell product displayed in the first upsell pitch page and the mechanism declining to purchase the first upsell product displayed in the first upsell pitch page has been selected by the customer device.

13. The non-transitory computer-readable storage medium of claim 12, wherein the code when executed further causes the computer processor to perform steps comprising:
responsive to determining that the selection of the mechanism accepting the purchase of the first upsell product displayed in the first upsell pitch page is received from the customer device:
receiving a paylink associated with one of the first upsell product, the paylink comprising purchase parameters;
extracting the purchase parameters from the paylink, and
charging the customer for the first upsell product based on the purchase parameters.

14. The non-transitory computer-readable storage medium of claim 13, wherein the purchase parameters comprise a first parameter describing that the customer device indicated an acceptance of the purchase of the first up sell product or declined the purchase of the first upsell product and a second parameter describing an identifier associated with the customer's purchase of the downloadable digital product.

15. The non-transitory computer-readable storage medium of claim 12, wherein the code when executed further causes the computer processor to perform steps comprising:
transmitting a pitch page including advertising information associated with the downloadable digital product and a link to complete a purchase of the downloadable digital product; and
receiving an indication of a selection of the link to complete the purchase of the downloadable digital product.

16. The non-transitory computer-readable storage medium of claim 12, wherein the one or more additional upsell products described by the decision tree are randomly selected or are specifically chosen by a vendor associated with the downloadable digital product.

17. A system for providing upsells to a customer device, the system comprising:
one or more computer processors; and
a non-transitory computer-readable storage medium storing executable code, the code when executed by the one or more computer processors causes the one or more computer processors to perform steps comprising:
completing a transaction for a customer's purchase of a downloadable digital product based on payment information included in an order form;
responsive to completing the transaction:
identifying a decision tree associated with the downloadable digital product, the decision tree describing a display order of one or more upsell pitch pages to be displayed on the customer device that describe one or more additional upsell products, wherein the one or more additional upsell products described by the decision tree are randomly selected or are specifically chosen by a vendor associated with the downloadable digital product, and providing a first up sell pitch page from the one or more up sell pitch pages to the customer device for display on the customer device based on the display order described in the decision tree, the first upsell pitch page describing a first up sell product;

determining whether a selection of a mechanism accepting to purchase the first upsell product displayed in the first upsell pitch page, or a selection of a mechanism declining the first upsell product displayed in the first upsell pitch page is received from the customer device;

responsive to determining that neither the selection of the mechanism accepting to purchase the first upsell product is received from the customer device, nor a selection of the mechanism declining the first up sell product is received from the customer device, refraining from sending a receipt page comprising a link to download the downloadable digital product, wherein the receipt page is provided to the customer device only after one of either the mechanism accepting the purchase of the first upsell product displayed in the first upsell pitch page and the mechanism declining to purchase the first upsell product displayed in the first upsell pitch page has been selected by the customer device.

18. The system of claim 17, wherein the code when executed further causes the one or more computer processors to perform steps comprising:

responsive to determining that the selection of the mechanism accepting the purchase of the first upsell product displayed in the first upsell pitch page is received from the customer device:

receiving a paylink associated with one of the first upsell product, the paylink comprising purchase parameters;

extracting the purchase parameters from the paylink, and charging the customer for the first upsell product based on the purchase parameters.

19. The system of claim 18, wherein the purchase parameters comprise a first parameter describing that the customer device indicated an acceptance of the purchase of the first upsell product or declined the purchase of the first upsell product and a second parameter describing an identifier associated with the customer's purchase of the downloadable digital product.

* * * * *